Aug. 17, 1965 E. M. BRADLEY 3,201,767

MAGNETIC STORAGE DEVICES

Filed Sept. 7, 1961

INVENTOR
EDWARD MICHAEL BRADLEY
BY Haseltine Lake & Co.
ATTORNEYS

United States Patent Office 3,201,767

Patented Aug. 17, 1965

3,201,767
MAGNETIC STORAGE DEVICES

Edward Michael Bradley, Stevenage, England, assignor to International Computers and Tabulators Limited, London, England Filed Sept. 7, 1961, Ser. No. 136,461
Claims priority, application Great Britain, Sept. 23, 1960, 32,750/60
7 Claims. (Cl. 340—174)

This invention relates to information storage devices employing magnetic storage elements.

Information storage devices have been proposed in which an anisotropic thin ferromagnetic film is supported on a substrate. The film has an easy direction of magnetism and is bistable, relaxing in the absence of an applied magnetic field into a stable state in which the magnetisation vector is aligned in one or the other direction along the easy axis. The film is switched from one stable state to the other under the influence of magnetic fields generated by driving currents passed through conductors lying in close proximity to the film. Prior devices of this kind have required that the film deposited onto the substrate and the surface of the film is then coated with an insulating material upon which the required pattern of driving conductors is laid. This has meant that each substrate is a self-contined unit and has required that each storage plane is individually wired for connection into an information processing system. Furthermore, in the event of a fault developing in the plane or its associated conductors, requiring the replacement of the plane, every connecting wire was required to be disconnected and reconnected to a replacement plane.

The object of the invention is to provide an improved construction for an information storage device employing thin magnetic films.

According to one aspect of the invention, a flexible composite conductor structure for use in information storage devices employing magnetic information storage films includes two sets of conductors, each set comprising ribbon-like conductors laterally spaced across the tape, the conductors of one set overlying corresponding conductors of the other set and being insulated therefrom, and a layer of conductive foil interleaved between and insulated from the sets of conductors, the foil layer being omitted from a predetermined part of the structure, the structure being so supported in use that said predetermined part lies in close proximity to the face of a thin magnetic storage film in order that both sets of conductors in said part are magnetically coupled to the film.

According to another aspect of the invention, an information storage device includes an area of thin magnetic information storage film supported on a substrate and an elongated composite conductor structure supported closely adjacent to one face of said film and extending beyond the film area, the composite structure including at least two overlying conductors insulated each from the other and from the film and conductive foil layers interleaved between the conductors in those parts of the composite structure extending beyond the film area.

The conductor structure may include a number of conductors in each set and a number of film areas may be coupled to these conductors. The substrates supporting these areas of film may be spaced apart in parallel planes and the composite conductor structure may then pass in serpentine fashion between the film substrates. A further conductor or conductors may be provided arranged transversely across the structure and coupled to the film areas.

The structure may comprise a pair of flexible layers of plastic film each carrying one or more conductive metallic ribbons, the foil being interleaved between the plastic layers. The foil may be of aluminium and in this case the foil may have anodised insulating surfaces.

The invention will now be described, by way of example, with reference to the accompanying drawing, in which.

Figures 1, 2, 3, 4:
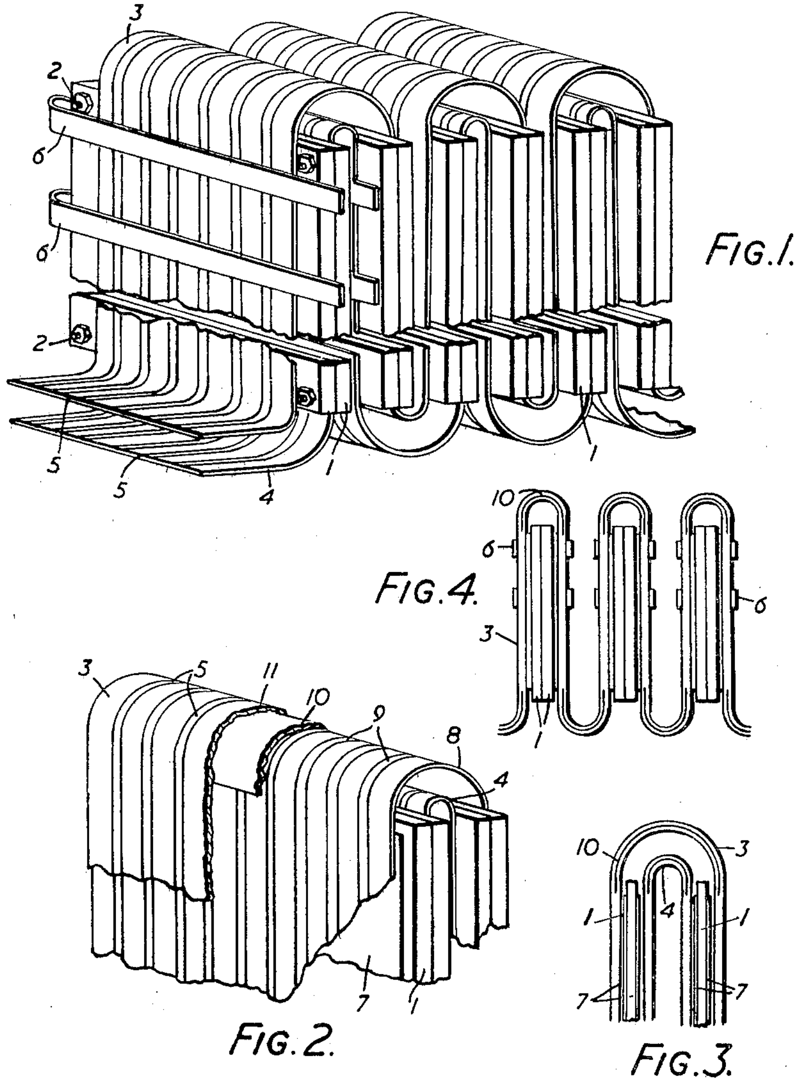
FIGURE 1 is a perspective view of a thin film storage matrix.
FIGURE 2 is a perspective detail view of part of the matrix showing the arrangement of conductors associated with the films.
FIGURE 3 is a schematic sectional view of an alternative arrangement of the matrix.
FIGURE 4 is a schematic sectional view of a further matrix arrangement.

The information storage matrix shown in FIGURE 1 has a number of substrate plates 1 arranged in spaced apart parallel planes. Each plate is made of a conductive material, such as aluminium. The major part of the outer face of each plate is covered by a thin magnetic storage film 7 (FIGURE 2). The plates are mounted back-to-back in pairs, the film 7 being deposited on the outwardly facing surfaces of the pair of substrate plates.

A composite conductor structure, or carrier, 3 passes in serpentine fashion round the pairs of plates 1, so that it is closely adjacent to the film on one plate of each pair. A second similar structure 4 follows a corresponding path, so that it is closely adjacent to the film on the other plate of each pair. Thus, if the substrates are considered as being in groups of two adjacent pairs each, it will be seen that one of the carriers traverses the inward facing surfaces of all the groups while the other carrier traverses the outward facing surfaces of all the groups. Since areas of film are supported on the exposed faces of the substrate plates, it will be appreciated that the conductors of a carrier are magnetically coupled to those areas of film supported by the substrate surfaces traversed by that carrier.

The composite carriers 3 and 4 are identically constructed and consist of layers of insulation, ribbon-like conductors and an interleaving layer of conductive foil. The construction of the carrier 3 is shown in detail in FIGURE 2.

In the area overlying the outer face of the film 7, the inner part of the carrier, which is in contact with the film 7, consists of a thin tape, or film, of synthetic plastic 8. The outer surface of the tape 8 carries a group of parallel sense conductors 9. A second similar plastic tape 11 is placed over the sheet 8 and its conductors 9, and the second tape also carries a group of drive conductors 5. Each of the drive conductors 5 is superimposed over one of the sense conductors 9. Each of the drive conductors may consist of a ribbon of copper foil applied separately to the plastic tape and secured in position thereon, or the complete conductor pattern on each tape may be formed by conventional printed circuit techniques, for example, the plastic tape may be bonded to a copper tape of similar width which is coated with a resist pattern to protect the conductors, the unwanted copper between the conductors then being etched away. Alternatively, the required pattern of conductors may be formed on a length of plastic tape by vacuum or electrolytic deposition using a suitable mask.

An anodised aluminum foil 10 is interleaved between the conductors 9 and the second sheet 11 in both carriers 3 and 4 in the space between adjacent plates over which the carriers pass. A similar foil is also interleaved in the same manner in the carriers at their ends and extends as far as the edge of the film carried by the first plate 1 over which the carriers pass. It will be seen therefore, that a piece of foil 10 is, in all cases, provided outside the boundaries of those areas of film over which the two carriers pass but is omitted from those portions of the carriers in which the conductors are required to be magnetically coupled to an area of film.

The only requirements for the carriers 3 and 4 are that they should provide the required pattern of sense and drive conductors, the two sets of conductors 9 and 5 respectively, being insulated from each other, from the film 7 and the interleaved foil 10 where this is provided, and that they should be sufficiently flexible to allow them to be wound in and out between the pairs of substrate plates. The necessary insulation is provided by the plastic sheets and by the anodised surface of the aluminum foil in the construction just described.

However, it will be appreciated that other forms of construction may be used to meet these requirements.

For example, the plastic sheet 8 may form the base of the carrier. The conductors 9 are formed by printed circuit techniques and are then covered by an insulating varnish. A conductive metal layer is formed over the varnish by vacuum and/or electrolytic deposition in the parts of the tape beyond the boundaries of the film areas, this layer taking the place of the foil described above.

The conductive layer is covered by a second layer of varnish and the conductors 5 are then produced by printed circuit techniques on the surface of the second layer of varnish.

In the practical storage matrix shown in FIGURE 1 additional selection arrangements are provided.

Each pair of plates 1 has associated therewith a number of word drive conductors 6 passing transversely across the carriers 3 and 4, only two conductors 6 being shown in FIGURE 1 for the sake of clarity. Each conductor 6 is in the form of an elongated open ended loop, with the long sides of the loop positioned close to the outer surface of the carriers 3 and 4. The sides of the loop are substantially perpendicular to the conductors of the carriers 3 and 4 and are positioned sufficiently closely to the film areas over which they pass to be magnetically coupled thereto.

During operation of the matrix shown in FIGURE 1, for example, the energisation of one or more of the digit drive conductors 5 at the same time as a word drive conductor 6 causes areas of the storage film 7 which are adjacent to the intersection of two energised conductors to be switched to the magnetic state which represents a binary one. Subsequent application of a current in the opposite direction to a word drive conductor 6 resets all the film storage areas adjacent to that conductor to the binary zero state. Any area which switches from the one to the zero state induces a signal in the sense conductor 9 which is adjacent to that area. Thus the signals produced on the sense conductors during the resetting indicate the information which was stored in a particular word position. One form of apparatus for providing the necessary drive currents to the word drive conductors is shown and described in co-pending U.S. application Serial No. 136,462 (filed September 9, 1961).

An example showing the construction and operation of a thin film storage matrix using a pair of thin films deposited on opposite faces of a conductive substrate plate is described in U.S. application Serial No. 16,695, (filed March 22, 1960), and it will be appreciated that this form of construction may be used in the present apparatus as shown in FIGURE 3, where the carriers 3 and 4 are laid over the outer faces of films 7 on both sides of single substrates 1. It will be apparent that this arrangement provides a back-to-back formation of pairs of film areas similar to the formation of the areas in the back-to-back arrangement of substrate pairs described earlier, the single substrate of FIGURE 3 taking the place of a pair of substrates as shown in FIGURE 1. It is pointed out in the application referred to that thin film storage devices are inherently capable of high speed operation. For example, switching of the film may take place in a time less than 100 millimicroseconds. At such speeds it is necessary to keep the self inductance of the sense and drive conductors and the mutual inductance between them as small as possible. The conductive substrate has the desired effect of reducing the self inductance and the mutual inductance in the area in which the conductor carriers 3 and 4 overlie the plates.

In a practical matrix, each substrate plate may be a square of approximately 4″ each side. The film on such a plate can conveniently provide storage for fifty words, each consisting of, say, thirty binary digits. Thus, there are fifty word drive conductors 6 associated with each plate. Each of these conductors is of the order of 20 cm. in length. The inherent delay time for a word conductor of this length is approximately one millimicrosecond, so that for drive pulses with a rise time considerably greater than this there is no difficulty.

U.S. Patent application Serial No. 16,165, previously referred to, also describes a form of construction in which the conductive substrate plate is used to form a pick up loop with the sense conductors. The same effect may be achieved in the present construction by earthing the plates 1 through the holding bolts, such as 2, and connecting one end of all the sense conductors to the same earth point.

The sense and digit drive conductors carried by the carriers 3 and 4 however are considerably longer than the word drive conductors 6, particularly in the case of a practical matrix having a number of plates. It is clear, then, that the effect of the conductive substrate in keeping the inductance of these conductors and also the mutual inductance between the sense and digit drive to a low value, as described in the earlier patent application referred to is not obtained over the portions of the conductors which are necessary to interconnect the pairs of plates. This difficulty is overcome by the provision of the conductive foil 10 outside the area of the plates. The foil 10 not only acts as a screen between the drive and sense conductors to reduce the mutual inductance to a low value, but it also reduces the self inductance of both the sense and digit drive conductors. It has been found that it is not necessary to connect the foil 10 to the earth system of the store for it to be fully effective.

It will be appreciated that if a considerable number of plates are used, the length of the carriers 3 and 4 may be considerable and it may in consequence be desirable to treat the conductors on these carriers as delay lines and to connect them to earth through a matching resistance of suitable value.

It will be seen that the use of two carriers 3 and 4 ensures that the length of each is almost half that required for a single carrier linked with every plate. Nevertheless, as shown in FIGURE 4 it is possible, for example, in the case where a relatively small number of plates is used, to use a single carrier 3 linked with all the plates. In a case such as this it will be appreciated that the centre of the loop conductor 6 may be connected to the conductive substrates, or for example, to a conductive foil between a pair of nonconductive substrates, to provide a separate word drive conductor for each film of a pair. FIGURE 4 also shows diagrammatically the position occupied by the foil 10 interleaved with the conductors in the areas outside the boundaries of the film carried by the plates 1. Similarly, only a single carrier is required if a number of separate singlesided plates are used, instead of the paired arrangement shown. The substrates of such an arrangement may, for example, be arranged end to end instead of being spaced apart as shown.

A further form of construction for the storage matrix envisages the provision of only a single set of conductors, such as 5, carried by the carrier 3 or 4. The conductors of this set are used for the dual purpose of sensing and driving. Under these circumstances the foil 10 is provided to reduce the self-inductance of the single set of conductors. This has the effect, for example of reducing that voltage appearing in the reading amplifier circuits which is generated at the front edge of driving current pulses applied to the conductors.

The constructional arrangements described provide a compact and simple construction for a multi-plate store. It will be appreciated that although the use of films deposited on conductive substrates has been described, the magnetic films may be deposited on conventional nonconductive substrate plates, such as glass, if desired, and the foil may then be used as described to reduce the inductance of the digit drive and sense conductors. Further, the foil may be used between any two sets of conductors of a film matrix, when it is necessary to provide mutual screening and low inductance, whatever the particular use of the conductors may be.

I claim:

1. An information storage device, including a substrate; an area of information storage magnetic thin film supported on said substrate; a first conductor; a second conductor overlying said first conductor and insulated therefrom, the conductors each being positioned with a first portion thereof lying adjacent said film area and with a second portion thereof positioned beyond said film area, the first portion of each conductor being magnetically coupled to said film area; and an electrically-conductive layer interleaved between said conductors only at said second portions thereof to reduce the self-inductance of said conductors and to reduce the mutual-inductance between said conductors.

2. An information storage device, including a substrate; an area of information storage magnetic thin film supported on said substrate; first and second flexible electrically-insulating tapes; a first conductor mounted on the first tape; a second conductor mounted on the second tape and overlying said first conductor and insulated therefrom, the tapes being positioned with a first portion of each of said conductors lying adjacent said film area and with a second portion of each of said conductors positioned beyond said film area, the first portion of each conductor being magnetically coupled to said film area; and a layer of electrically-conductive foil insulated from said conductors and interleaved only between the second portion of said first conductor and the second portion of said second conductor to reduce the inductance of the conductors.

3. An information storage device, including a plurality of substrates; a separate information storage magnetic thin film area supported on each substrate, respectively; a first elongated conductor; a second elongated conductor overlying said first conductor and insulated therefrom, each of said conductors having a plurality of operating portions and an intermediate portion between each pair of adjacent operating portions, said conductors being positioned with the intermediate portions lying outside the film areas and with each operating portion lying adjacent one of said film areas and being magnetically coupled therewith; and a layer of electrically-conductive foil insulated from said conductors and interleaved only between the intermediate portions of the conductors to reduce the inductance of said intermediate portions.

4. An information storage device, including a plurality of planar substrates; a separate information storage magnetic thin film area supported on each substrate, respectively; and a conductor assembly including a flexible electrically-insulating tape, a set of first conductors mounted on said tape, a set of second conductors overlying said first conductors and being insulated therefrom, and at least one area of electrically-conductive foil positioned between the two sets of conductors to reduce the inductance of said conductors, the conductor assembly being positioned with portions of said conductors lying adjacent said film areas and being magnetically coupled thereto, and with said area of foil positioned only outside the film areas.

5. An information storage device, including a plurality of spaced-apart parallel substrates; a separate information storage magnetic thin film area supported on each substrate, respectively; a conductor assembly including a flexible electrically-insulating tape, a set of first conductors mounted on said tape, a set of second conductors overlying said first conductors and being insulated therefrom, and at least one area of electrically-conductive foil positioned between the two sets of conductors and extending over a part of the length of said conductors to reduce the inductance of said conductors, the conductor assembly being positioned so that it passes in serpentine fashion relative to said substrates with the area of foil positioned only beyond the film areas and with further portions of said conductors lying adjacent said film areas and being magnetically coupled therewith.

6. An information storage device, including a conductor assembly, said assembly including a flexible electrically-insulating tape, a set of first elongated conductors mounted on one face of said tape, a set of second elongated conductors overlying said first conductors and being insulated therefrom, and a plurality of electrically-conductive layers formed on the other face of said tape and spaced apart at intervals along the length of the tape and effective to reduce the inductance of the conductors carried by the tape; a plurality of substrates; and a separate information storage magnetic thin film area supported on each substrate, respectively, said film areas being positioned adjacent said assembly and magnetically coupled to both sets of conductors, each film area being aligned with a part of the tape lying between two adjacent conductive layers.

7. An information storage device, including a plurality of substrates each having first and second surfaces; a separate information storage magnetic thin film area supported on the first surface of each substrate, respectively; first and second conductor assemblies each including two flexible non-conductive tapes, a set of first conductors mounted on one tape, a set of second conductors mounted on the other tape and overlying said first conductors and being insulated therefrom, and at least one area of electrically-conductive foil interleaved between portions of said tapes to reduce the inductance of said sets of first and second conductors; and mounting means to mount the substrates in pairs with the second surfaces in contact, the pairs of substrates being arranged in groups, each group comprising two adjacent pairs of substrates, the conductor assemblies being positioned so that they pass in serpentine fashion relative to said pairs of substrates with the areas of foil lying only outside said film areas and with further portions of the conductors of said first assembly magnetically coupled to inwardly facing film areas of said groups and with further portions of the conductors of said second assembly magnetically coupled to outwardly facing film areas of said groups.

References Cited by the Examiner

UNITED STATES PATENTS

| | | | |
|---|---|---|---|
| 2,978,683 | 4/61 | Alexander | 340—174 |
| 3,048,829 | 8/62 | Bradley | 340—174 |
| 3,084,336 | 4/63 | Clemons | 340—174 |

OTHER REFERENCES

Pages 56–59, #75, February 1959, publication I, "New Developments in Magnetic Materials and Applications," Electrical Manufacturing.

IRVING L. SRAGOW, *Primary Examiner.*